(12) United States Patent
DeFrisco

(10) Patent No.: US 6,467,214 B1
(45) Date of Patent: Oct. 22, 2002

(54) FISHING LINE FLOAT

(76) Inventor: Guy DeFrisco, 25760 Rancho Adobe, Valencia, CA (US) 91355

( * ) Notice: Subject to any disclaimer, the term of this patent is extended or adjusted under 35 U.S.C. 154(b) by 0 days.

(21) Appl. No.: 09/819,834

(22) Filed: Mar. 28, 2001

(51) Int. Cl.$^7$ .......................... A01K 93/00; A01K 91/00
(52) U.S. Cl. ........................ 43/43.14; 43/43.1; 43/44.9; 43/44.92
(58) Field of Search .................. 43/43.14, 44.91, 43/44.93, 44.92, 43.1, 44.97, 44.16, 43.12, 44.87, 44.88, 44.89, 42.48, 44.9

(56) References Cited

U.S. PATENT DOCUMENTS

| | | | | |
|---|---|---|---|---|
| 983,309 A | * | 2/1911 | Pflueger | 43/44.94 |
| 1,468,720 A | * | 9/1923 | Low | 43/44.91 |
| 2,591,558 A | * | 4/1952 | Kramer | 43/44.9 |
| 2,804,715 A | * | 9/1957 | Kimbrough | 43/44.87 |
| 3,866,346 A | * | 2/1975 | Schneider | 43/44.87 |
| 4,696,125 A | * | 9/1987 | Rayburn | 43/43.14 |
| 5,329,722 A | * | 7/1994 | Wilson | 43/44.94 |
| 5,490,348 A | * | 2/1996 | Serba | 43/44.93 |
| 5,499,472 A | * | 3/1996 | Krenn | 43/44.97 |

* cited by examiner

*Primary Examiner*—Charles T. Jordan
*Assistant Examiner*—Tara M. Golba
(74) *Attorney, Agent, or Firm*—Gary D. Schnittgrund

(57) ABSTRACT

The invention is a fishing float and method of using the same that permits a positive attachment to a fishing line and that provides secure, easy and rapid attachment of the fishing line to the float and that allows the weight of the float to be readily changed thereby controlling the casting and float characteristics of the float.

8 Claims, 3 Drawing Sheets

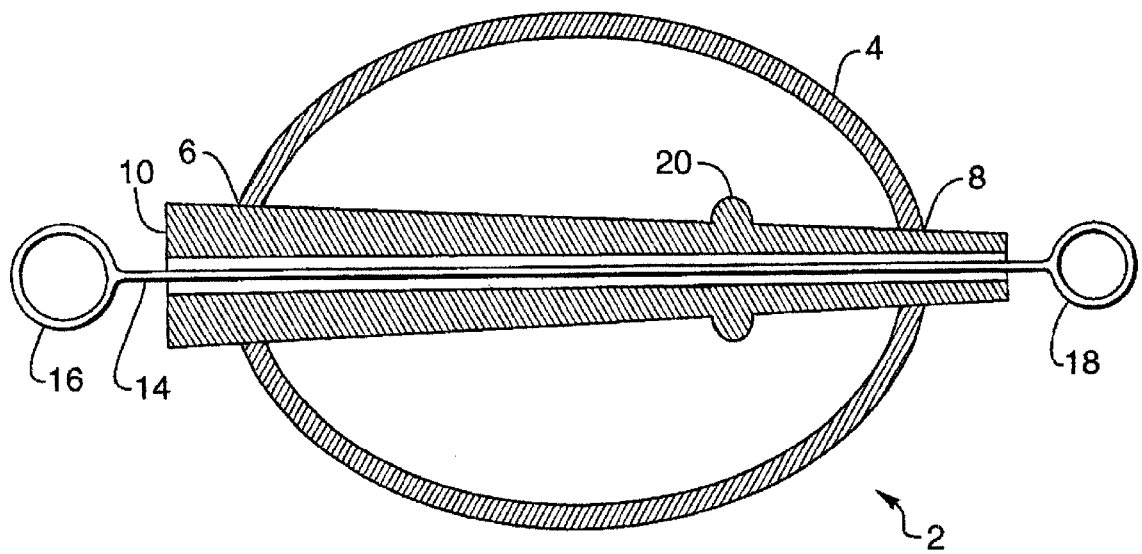
*Fig. 6*
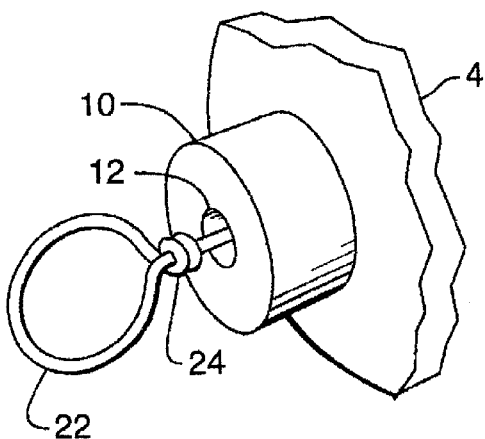 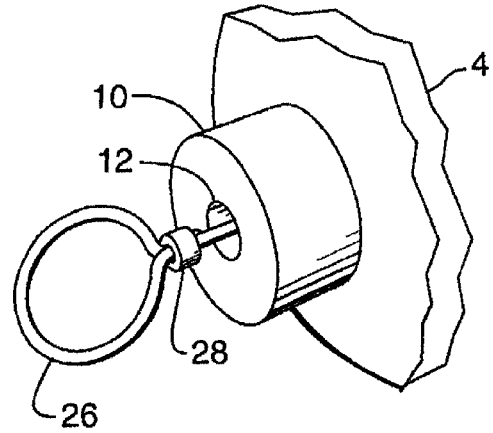
*Fig. 7*  *Fig. 8*

FISHING LINE FLOAT

BACKGROUND OF THE INVENTION

1. Field of the Invention

This invention relates to a float device, and more specifically concerns a fishing line float which permits a positive attachment to a fishing line and provides ease of attachment of the float to the line.

2. Description of the related art including information disclosed under 37 CFR Secs. 1.97–1.99.

Fishing floats, bobbers and similar structures and devices that are attachable to fishing lines have been known for many years. Earlier designs were simple floating structures to which a line could be tethered, such as cork floats. Later came the development of the slip-type float in which the fishing line was threaded through a permanent opening in a buoyant body, which allowed the line to slip with respect to the buoyant body in a desired manner. Because of certain limitations in these slip-type floats, efforts were made to improve upon the earlier models, to add greater versatility, and to provide easier, and simpler ways to attach a fishing line to a slip-type floating device, and to remove it therefrom as required. To this end, floating devices such as patented by Rayburn in 1983 (U.S. Pat. No. 4,418,492) were devised. While such prior efforts represented an improvement over the earlier designs, there nevertheless remains a need for set-type floating devices that are simple in design yet highly effective, reliable and easy to use.

Slip-type floats are generally formed of a float body with a central bore or passage. In such cases, the fishing line is first threaded through the float body and, thereafter, one or more hooks and a sinker are applied to the end of the line. During use, such a float is able to slide along the fishing line until abutting a loop knot, with segment of rubber band or soft string, obstruction, or the like in the line which acts as a stop past which the float will not pass. When the float requires removal, the line is usually cut at a point above the usual tackle and a rethreading of a new float made on the line. This wastes time and fishing line.

In some cases, small plastic floats have been threaded onto fishing lines to act as slip floats, as by Wise in 1976 (U.S. Pat. No. 3,991,506). However, should dirt, grit or beads of water become entrained within the floats, the floats may become jammed on the fishing line. Hence, a fishing hook may become located to a shallower depth than intended.

It has been found that when a fishing line has been provided with a slip-type of float, one or more hooks, and a sinker, sliding of the float backwards on the line during flight impedes accurate casting.

It is known to construct floats that can be removed from a line from time to time. For example, a float can be made of two parts that are hinged together so as to sandwich a fishing line therebetween when closed. In this case, use has been made of interfitting ribs at the ends of the two parts of the float in order to clamp the fishing line to the float. In other cases, the floats have been made of two pieces that can dovetail together in a slide fit relation so as to clamp onto a fishing line. In 1986 Dmytriw patent such a device (U.S. Pat. No. 4,616,441) having two body members as shells with slits provided for a fishing line. In 1995 Gibney (U.S. Pat. No. 5,377,444) patented a float having the line pass longitudinally through a body slot in the outer surface of the body and having a rod and disk assembly that rotate to lock the line in place.

Standard floats are all subject to the problem that when the fishing line is reeled in the float contacts the rod tip. This results in the float being moved from its desired position on the line.

The present invention allows the float to be used as a float or sinker. Filling the float with water causes it to become a sinker without removing the float from the fishing line. The standard float requires a fisherman to feed his line through the center of the float and place two split shots on each side of the float so that the float will not slide up or down the line. Then the hook is attached to the end of the fishing line. The entire process takes an average fisherman 15 to 20 minutes under ideal weather conditions. The present invention allows a standard snap-type swivel to be hooked directly to the float.

SUMMARY OF THE INVENTION

The apparatus of the instant invention is a float for fishing that allows for quick, easy and secure attachment of the leader and hook to the fishing float and of the fishing line to the float. The fishing float comprises a hollow body, two apertures, having different diameters, on opposite sides of the hollow body, forming a small diameter aperture and a large diameter aperture, a tapered pin having a large diameter end and a small diameter end passing thorough said apertures in said hollow body wherein the large diameter end of the pin engages and fills the large diameter aperture and the small diameter end of the pin engages and fills the small diameter aperture when the tapered pin is in its closed position, one loop on the small diameter end of the tapered pin for attaching to a fishing line.

The loop on the small diameter end of the tapered pin has a smaller diameter than the small diameter aperture in the hollow body. The loop is attached to the fishing line by means of a hook that is attached to the fishing line. The tapered pin has a diametral stop which is larger in diameter than the large diameter aperture in the hollow body which allows the pin to be partially withdrawn so the hollow body may be filled with a weight, such as water or metal shot, while the pin is retained in the hollow body.

The two loops are on each opposing end of the tapered pin, for attachment to a fishing line. The tapered pin is a hollow tube, a wire with loops on each end, for attachment to a fishing line, passes through the length of the tapered pin. The loop may be an integral part of the tapered pin or it may be a loop on the small diameter end of the tapered pin, where it has a smaller diameter than the small diameter aperture in the hollow body.

The hollow body has two apertures of different diameters, each aperture being on opposite sides of the hollow body, forming a small diameter aperture and a large diameter aperture, a tapered pin having a diametral stop which is larger in diameter than the large diameter aperture in the hollow body and allows the tapered pin to be withdrawn partially from the hollow body so that the hollow body may be filled with a weight while the pin is retained in the hollow body, loops on each end of the tapered pin, the loop on the small diameter end of the tapered pin is smaller in diameter than the small diameter aperture in the hollow body.

A method of using the fishing bobber where the line is fastened to at least one loop on an end of a tapered pin, which passes along the length of a hollow body, withdrawing the tapered pin and partially filling the hollow body with a weight, such as water or metal shot, pushing the tapered pin firmly into the hollow body thereby sealing the hollow body from water leakage. This includes fastening the line to the loop with a snap hook.

The advantage of the instant invention of prior art is that the fishing bobber can be quickly and securely fastened and removed from the fishing line and the leader and hook assembly. The fisherman can control the weight of the bobber and the depth at which the bobber floats in the water during fishing. Prior inventions require the fisherman to carefully thread the nearly invisible line through a long and narrow passage through the center of the fishing bobber. Then the fisherman must secure the bobber in place on the line by attaching separate retaining means, such as split shot placed on the fishing line. The instant invention avoids all of this additional complexity.

OBJECTS OF THE INVENTION

It is the object of the invention to be able to securely attach a hook to a fishing line float at a submerged point below the surface of the water for fishing purposes.

It is the object of the invention to provide a fishing line float that can be readily attached to or removed from a fishing line.

It is another object of the invention to provide a fishing float with a means of quickly attaching or detaching the hook from the float.

It is another object of the invention to provide a fishing float with a means of quickly attaching or detaching the fishing line from the float.

It is an object of the invention to provide a fishing float with a means of reliable attachment to the fishing line and that allows the float to be easily filled with a weight so as to be control the weight for casting and the depth to which the float sinks.

Other objects, advantages and novel features of the present invention will become apparent from the following detailed description of the invention when considered in conjunction with the accompanying drawing.

BRIEF DESCRIPTION OF THE DRAWINGS

FIG. 6 illustrates a longitudinal sectional view through the fishing float showing the tapered tube and diametral stop.

FIG. 7 illustrates the large diameter loop in a wire.

FIG. 8 illustrates the large diameter loop in a wire made by use of a ferrule.

DETAILED DESCRIPTION OF THE PREFERRED EMBODIMENT

Figure 1:
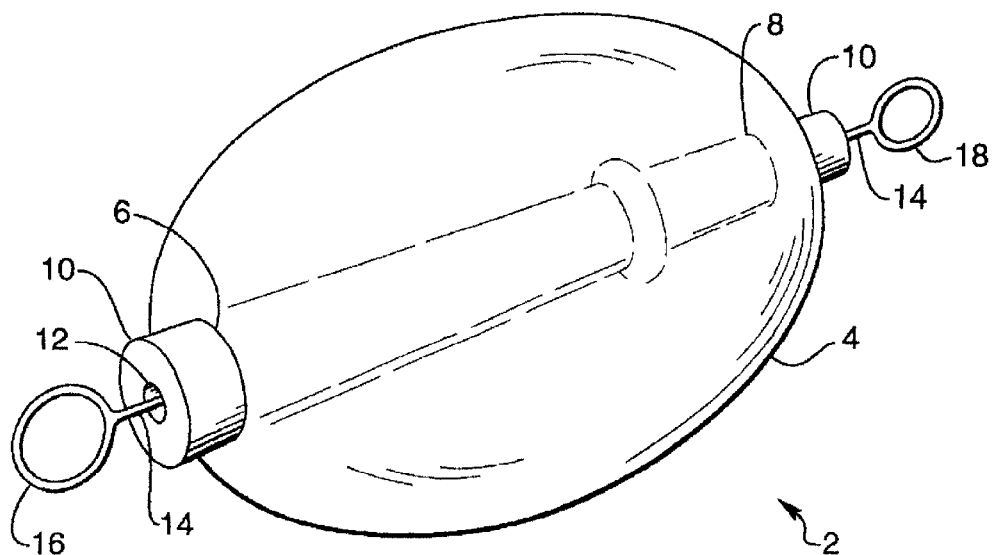
FIG. 1 illustrates a perspective view of the fishing float assembly.
Figure 2:
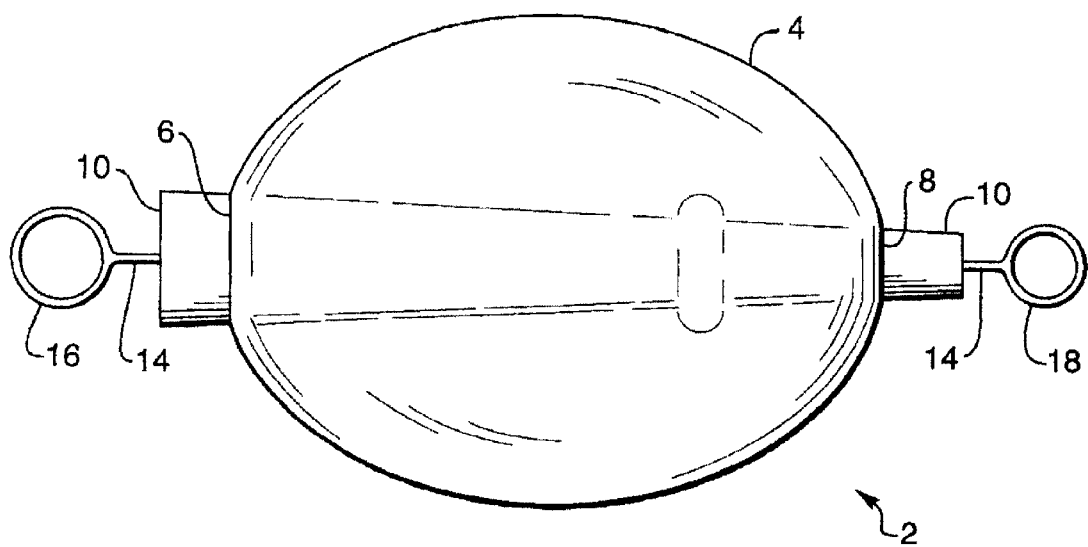
FIG. 2 illustrates a side view of the fishing float showing the tapered pin with loops formed on each end of the tapered pin.
Figure 3:
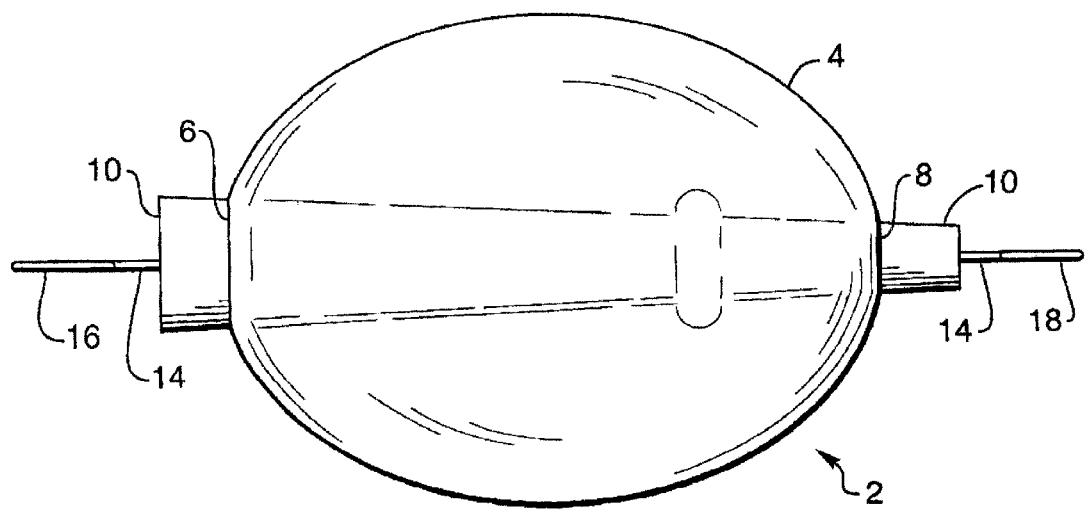
FIG. 3 illustrates a top view of the fishing float.
Figure 4:
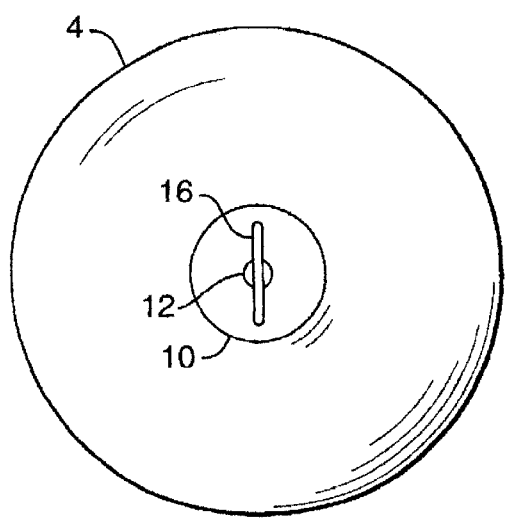
FIG. 4 illustrates a left end view of the fishing float showing the large diameter end of the tapered tube.
Figure 5:
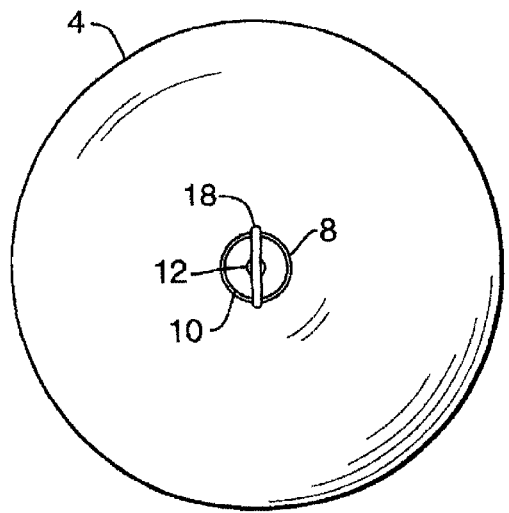
FIG. 5 illustrates a right end view of the fishing float showing the small diameter end of the tapered tube.

FIGS. 1, 2, 3, 4, and 5 provide views of a preferred embodiment of the fishing float, generally designated 2, comprising hollow body 4, which is generally made of transparent plastic, large diameter tapered aperture 6, small diameter tapered aperture 8, tapered pin 10 which in a preferred embodiment has tapered bore 12 running longitudinally the entire length of tapered pin 10. The diameter of large diameter aperture 6 and the diameter of small diameter aperture 8 are approximately equal to the diameter of tapered pin 10 at their contact area, when the pin is fully engaged in body 4, thus assuring a snug fit of pin 10 in body 4.

Wire 14 passes through tapered pin 10 in tapered bore 12. Large diameter loop 16 and small diameter loop 18 are formed in the ends of the wire, such that loop 16 is formed on the end nearest large diameter aperture 6, and small diameter loop 18 is formed on the end nearest small diameter aperture 8.

An important feature of the invention is that the outer diameter of small diameter loop 18 is less than the diameter of aperture 8, thus assuring that pin 10 can be moved longitudinally in the direction of large diameter aperture 6 so as to place loop 18 inside body 4. As pin 10 is moved toward aperture 6, diametral stop 20, shown in cross section in FIG. 6, strikes body 4 near large diameter aperture 6, retaining pin 10 in body 4. The outside diameter of diametral stop 20 is larger than the internal diameter of large aperture 6.

When pin 10 has been moved toward aperture 6 so as to remove pin 10 from small diameter aperture 8, weight such as water or metal shot, preferably lead shot, can readily be placed inside body 4 so as to modify its casting characteristics or depth of float during fishing.

Small diameter loop 18 may be attached directly to both the fishing line and leader with hook line by using a conventional snap hook (not shown). The fishing line may be attached to one loop and the leader line with fishing hook may be attached to the opposing hook.

FIGS. 7 and 8 present alternative methods by which the loops may be formed, wire wrap 24 forming loop 22 and ferrule 28 forming loop 26 by alternative methods of forming a secure loop in wire 14.

In an alternative embodiment (not shown), pin 10 is integrally attached to loop 16 and loop 18 such that wire 14 is not present. Loops 16 and 18 must be very strong and must be very securely bonded to pin 10 so as to assure that they do not fail during the casting and fishing operation for which the instant invention is intended.

Obviously, many modifications and variations of the present invention are possible in light of the above teachings. It is therefore to be understood that, within the scope of the appended claims, the invention may be practiced otherwise than as specifically described.

What is claimed is:

1. A fishing float comprising:
   a hollow body having two apertures of different diameters, each aperture being on opposite sides of the hollow body, forming a small diameter aperture and a large diameter aperture,
   a tapered pin having a diametral stop which is larger in diameter than the large diameter aperture in said hollow body and allows said tapered pin to be withdrawn partially from the hollow body so that the hollow body may be filled with weight through the small diameter aperture while the pin is retained in said hollow body,
   loops on each end of said tapered pin,
   the loop on a small diameter end of said tapered pin is smaller in diameter than the small diameter aperture in said hollow body.

2. A method of weighting a fishing bobber comprising:
   moving a tapered pin having a loop on a small diameter end of said tapered pin, where the outer diameter of said loop is smaller than a small diameter aperture in a hollow body through which said tapered pin passes, in a first direction longitudinally along the long axis of the pin from the small diameter aperture in a hollow body toward a large diameter aperture on the opposite side of said hollow body, adding weight inside said hollow body by placing said weight through said small diameter aperture, moving said tapered pin in an opposite second direction into said hollow body, thereby sealing the hollow body from water leakage.

3. A method of using a fishing bobber as in claim 2, comprising:

stopping total removal of the tapered pin by having a diametral stop on said pin where the outer diameter of said stop is larger than the diameter of a large diameter aperture in said hollow body.

4. A fishing float comprising:

a hollow body;

two apertures, having different diameters, on opposite sides of the hollow body, forming a small diameter aperture and a large diameter aperture;

a tapered pin having a large diameter end and a small diameter end passing through said apertures in said hollow body wherein the large diameter end of the pin engages and fills the large diameter aperture and the small diameter end of the pin engages and fills the small diameter aperture when the tapered pin is in its closed position;

a loop on the small diameter end of said tapered pin for attaching to a fishing line; and said loop on the small diameter end of said tapered pin having a smaller diameter than the small diameter aperture in the hollow body, allowing said tapered pin to move toward said large diameter aperture until said small diameter aperture is completely free of said tapered pin.

5. A fishing float comprising:

a hollow body;

two apertures, having different diameters, on opposite sides of the hollow body, forming a small diameter aperture and a large diameter aperture;

a tapered pin having a large diameter end and a small diameter end passing through said apertures in said hollow body wherein the large diameter end of the pin engages and fills the large diameter aperture and the small diameter end of the pin engages and fills the small diameter aperture when the tapered pin is in its closed position;

a loop on the small diameter end of said tapered pin for attaching to a fishing line;

said tapered pin having a diametral stop which is larger in diameter than the large diameter aperture in said hollow body which allows said pin to be retained within said hollow body as said tapered pin is moved toward said large diameter hole so the hollow body may be filled by placing weight through the small diameter aperture while the pin is retained in said hollow body; and said loop on the small diameter end of said tapered pin having a smaller diameter than the small diameter aperture in the hollow body.

6. A fishing float comprising:

a hollow body;

two apertures, having different diameters, on opposite sides of the hollow body, forming a small diameter aperture and a large diameter aperture;

a tapered pin having a large diameter end and a small diameter end passing through said apertures in said hollow body wherein the large diameter end of the pin engages and fills the large diameter aperture and the small diameter end of the pin engages and fills the small diameter aperture when the tapered pin is in its closed position;

a loop on the small diameter end of said tapered pin for attaching to a fishing line;

said tapered pin having a diametral stop which is larger in diameter than the large diameter aperture in said hollow body which allows said pin to be retained within said hollow body as said tapered pin is moved toward said large diameter hole so the hollow body may be filled by placing weight through the small diameter aperture while the pin is retained in said hollow body;

said tapered pin is a hollow tube; and a wire with loops on each end, for attachment to a fishing line, passing through the length of the hollow tube.

7. A fishing float comprising:

a hollow body;

two apertures, having different diameters, on opposite sides of the hollow body, forming a small diameter aperture and a large diameter aperture;

a tapered pin having a large diameter end and a small diameter end passing through said apertures in said hollow body wherein the large diameter end of the pin engages and fills the large diameter aperture and the small diameter end of the pin engages and fills the small diameter aperture when the tapered pin is in its closed position;

a loop on the small diameter end of said tapered pin for attaching to a fishing line;

said tapered pin having a diametral stop which is larger in diameter than the large diameter aperture in said hollow body which allows said pin to be retained within said hollow body as said tapered pin is moved toward said large diameter hole so the hollow body may be filled by placing weight through the small diameter aperture while the pin is retained in said hollow body;

the loop is an integral part of said tapered pin; and said loop on the small diameter end of said tapered pin having a smaller diameter than the small diameter aperture in the hollow body.

8. A fishing float comprising:

a hollow body;

two apertures, having different diameters, on opposite sides of the hollow body, forming a small diameter aperture and a large diameter aperture;

a tapered pin having a large diameter end and a small diameter end passing through said apertures in said hollow body wherein the large diameter end of the pin engages and fills the large diameter aperture and the small diameter end of the pin engages and fills the small diameter aperture when the tapered pin is in its closed position;

a loop on the small diameter end of said tapered pin for attaching to a fishing line;

said tapered pin is a hollow tube; and a wire with loops on each end, for attachment to a fishing line, passing through the length of the hollow tube.

* * * * *